O. VOIGTLÄNDER & H. LOHMANN.
PROCESS FOR PRODUCING HOMOGENEOUS BODIES OF CHEMICALLY PURE TUNGSTEN METAL OF ANY DESIRED SHAPE.
APPLICATION FILED DEC. 2, 1913.
1,212,426.
Patented Jan. 16, 1917.
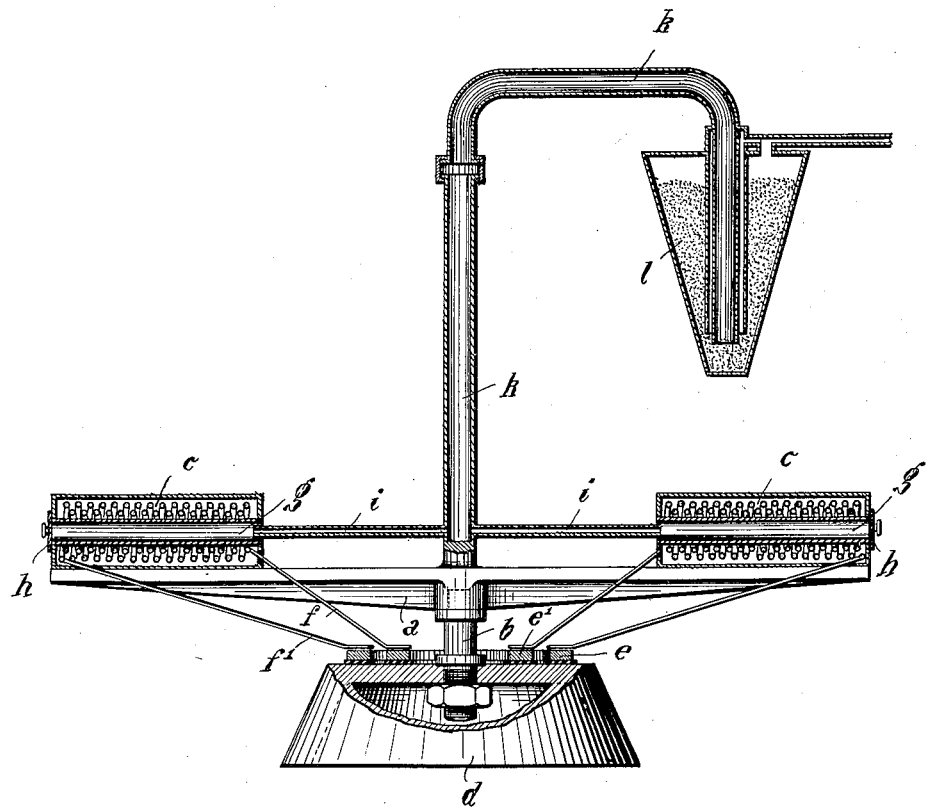

UNITED STATES PATENT OFFICE.

OTTO VOIGTLÄNDER AND HUGO LOHMANN, OF ESSEN-ON-THE-RUHR, GERMANY.

PROCESS FOR PRODUCING HOMOGENEOUS BODIES OF CHEMICALLY-PURE TUNGSTEN METAL OF ANY DESIRED SHAPE.

1,212,426.  Specification of Letters Patent.  Patented Jan. 16, 1917.

Application filed December 2, 1913. Serial No. 804,206.

*To all whom it may concern:*

Be it known that we, OTTO VOIGTLÄNDER, manufacturer, and HUGO LOHMANN, engineer, citizens of the German Empire, and residents of Essen-on-the-Ruhr, Germany, have invented certain new and useful improvements in processes for producing homogeneous bodies of chemically-pure tungsten metal of any desired shape; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the patent application Serial No. 756214 a process for producing tungsten metal (wolfram) in homogeneous pieces of any desired form is disclosed, the characteristic feature of said process being that a mixture containing for example $WO_3Al$ is placed in a fireproof chamber of a furnace of any desired construction, in which the heat of reaction combined with the heat of the furnace causes the WO reduced by the Al to be converted into a compact piece of tungsten metal. If it is desired to produce chemically pure tungsten metal by said process the WO and the admixed Al must also be chemically pure, because all impurities are generally present in the tungsten metal obtained. This is the case whether $H_2WO_4$ or $WO_3$ or other oxids are treated. It is known that the production of pure oxids, according to any existing process, is accompanied by great difficulties and expense. Further it is known that the production of chemically pure metals from ores or oxids is also accompanied by great difficulties and expense.

In all the processes heretofore used for producing chemically pure metals, more or less impure metals are firstly obtained from the ores of oxids by tedious metallurgical methods. Thereafter the admixtures are removed by complicated chemical processes.

According to the present process chemically pure tungsten can be obtained in compact pieces from impure anhydrids and oxids in one single operation. Further, the present process enables chemically pure metal of any kind to be obtained in one operation in the simplest and cheapest manner.

For this purpose a mixture of $WO_3Al$, for example, is subjected to centrifugal force in the heated chamber of the furnace, so that all impurities are separated. Or, if it is desired to obtain chemically pure iron, the powdered ore and the theoretically correct quantity of powdered carbon and lime are subjected to centrifugal force in the heated chamber of a rotary furnace, so that all admixtures and impurities are separated.

Several processes already exist, for example, that described in the German Patent 80041, class 14, or British Patent 16545/1890, according to which molten metal or ore is purified or separated by means of centrifugal force. The present process differs from such existing processes by the fact that not ready molten metals, ores, or metal compounds, are subjected to centrifugal force, but the production of the chemically pure metals from ores or oxids is effected with the assistance of centrifugal force in an electrically heated rotary furnace in one operation.

The adjacent drawing illustrates by way of example one construction of an apparatus for carrying out this process.

The wheel $a$ is mounted on the horizontally, or vertically, arranged shaft $b$. On the wheel $a$ a number of electric furnaces $c$ are arranged radially or tangentially. To a plate $d$ are attached the slide contacts $e$ and $e^1$. By means of these slide contacts and by the contact rails $f$, $f^1$ the electric current is conducted to the furnace.

In the apparatus illustrated on the drawing the heated chambers $g$ of the furnaces $c$ have a tubular form, and the outer openings of said tubes $g$ can be closed by covers $h$. With the inner openings of the tubes $g$ communicate pipes $i$, which all lead to a rotary pipe $k$ at the middle of the wheel $a$. The pipe $k$ leads to the receptacle $l$, which is filled with the material to be treated.

The process is carried out as follows: When the circuit has been closed and the furnaces $c$ have reached the requisite temperature, the wheel $a$ is caused to rotate. Then, the mixture to be treated, for example $WO_3Al$, is forced out of the receptacle $l$, together with a reducing gas, for example hydrogen, by pneumatic means, as is well known, through the pipes $k$ and $i$ into the heated chambers $g$ of the furnaces $c$. In said chambers the mixture is subjected to the reaction, and the heat of this reaction, in combination with the heat of the furnace, causes the material to melt, and, in doing so, the various parts of the product obtained are separated, owing to their different weights, by centrifugal force. A reducing gas is in this case only necessary when somewhat less than the theoretically calculated quantity of Al is present. If more than this theoretical quantity of Al is present in addition to the known pneumatic charge of the furnace $c$, an indifferent gas, for example nitrogen, or, if the excess of Al is considerable, an oxidizing gas, for example compressed air, may be used. By such means chemically pure, and, as the centrifugal force also simultaneously separates all gaseous reacting products quite dense metal is obtained.

If another chemically pure metal, for example iron, is to be obtained, the receptacle $l$ is filled with the usual powdered mixture of iron ore, carbon, and lime, and this mixture is then treated in the manner above explained with an oxidizing gas when there is an excess of carbon, and with a reducing gas, if there is less than the requisite quantity of carbon, and with an indifferent gas, when working with the absolutely correct quantity of carbon, said mixture being forced through the pipes $k$ and $i$ into the heated chambers $g$ of the furnaces $c$. In these chambers the reaction of the mixture takes place, and the various constituents are separated by centrifugal force. In such cases, in which solid reducing substances, such as carbon, aluminium, etc., are not employed, but the reduction of the oxids and the oxidation of the admixtures is effected by gases, such gases are also used for pneumatically charging the furnaces.

If more easily melted metal than iron, for which the temperature of the furnaces suffices to maintain the molten condition, are to be produced according to the present process, in order to obtain a continuous operation in known manner, the various products can be caught up by outlet pipes provided in the particular zones of the tubes $g$.

According to the present process it is possible to produce chemically pure metal of any kind in such a cheap manner that it will be possible to use the same for technical purposes to a very extensive degree.

Claims:

1. The process of producing chemically pure metals, which comprises supplying a reducing charge containing metallic aluminum to a heated rotating chamber, and centrifugally compacting the resulting reduced metal.

2. The process of producing chemically pure metals, which comprises supplying to a heated chamber rotating at sufficient speed for centrifugal separation a reducing charge under the action of a gas.

3. The process of producing chemically pure metals, which comprises electrically heating a furnace chamber, supplying a reducing charge to said heated chamber by means of a reducing gas while subjecting the chamber and charge to centrifugal action.

4. The process of obtaining chemically pure metals, which comprises supplying to a heated chamber rotating at sufficient speed for centrifugal separation a reducing charge containing aluminum under the action of a gas.

5. The process of producing chemically pure metals, which comprises inductively heating a furnace chamber, supplying a reducing charge containing aluminum to said heated chamber by means of a reducing gas, while subjecting the chamber and charge to centrifugal action.

In testimony that we claim the foregoing as our invention, we have signed our names in presence of two subscribing witnesses.

OTTO VOIGTLÄNDER. [L. S.]
HUGO LOHMANN. [L. S.]

Witnesses:
  ALBERT NUFER,
  FRANCES NUFER.